United States Patent [19]

Huh

[11] Patent Number: 5,592,300
[45] Date of Patent: Jan. 7, 1997

[54] METHOD AND APPARATUS FOR USING PROGRAMMING SIGNALS FOR AUTOMATIC TIME SETTINGS

[75] Inventor: Chung H. Huh, Kyungki-do, Rep. of Korea

[73] Assignee: Goldstar Co., Ltd., Seoul, Rep. of Korea

[21] Appl. No.: 365,924

[22] Filed: Dec. 29, 1994

[30] Foreign Application Priority Data

Dec. 30, 1993 [KR] Rep. of Korea ............... 31524/1993
Feb. 3, 1994 [KR] Rep. of Korea ............... 2043/1994

[51] Int. Cl.⁶ .................................................. H04N 5/76
[52] U.S. Cl. ................... 386/113; 360/27; 360/69; 348/5; 386/46
[58] Field of Search ............................ 358/335, 310; 348/5, 725, 906; 360/27, 33.1, 69; 455/260; H04N 5/76, 5/782

[56] References Cited

U.S. PATENT DOCUMENTS 4,203,130  5/1980  Doumit et al. ................ 348/97
5,488,409  1/1996  Yuen et al. .................... 358/335
5,500,741  3/1996  Balk et al. .................... 358/335

*Primary Examiner*—Thai Q. Tran
*Assistant Examiner*—Khoi Truong
*Attorney, Agent, or Firm*—Finnegan, Henderson, Farabow, Garrett & Dunner, L.L.P.

[57] ABSTRACT

A method and device for automatic time setting utilizing broadcasting signal which can set the present time automatically utilizing broadcasting signals of teletext and video program system. The automatic time setting device includes a tuner and demodulation means for synchronizing, receiving and demodulating broadcasting signals, a data slicer for slicing teletext data in package units of the data received from the tuner and demodulation means, a teletext processor for converting the teletext data received from the data slicer into character data, and a first microcomputer for controlling the teletext processor and setting the present time with the character data received from the teletext processor.

15 Claims, 6 Drawing Sheets

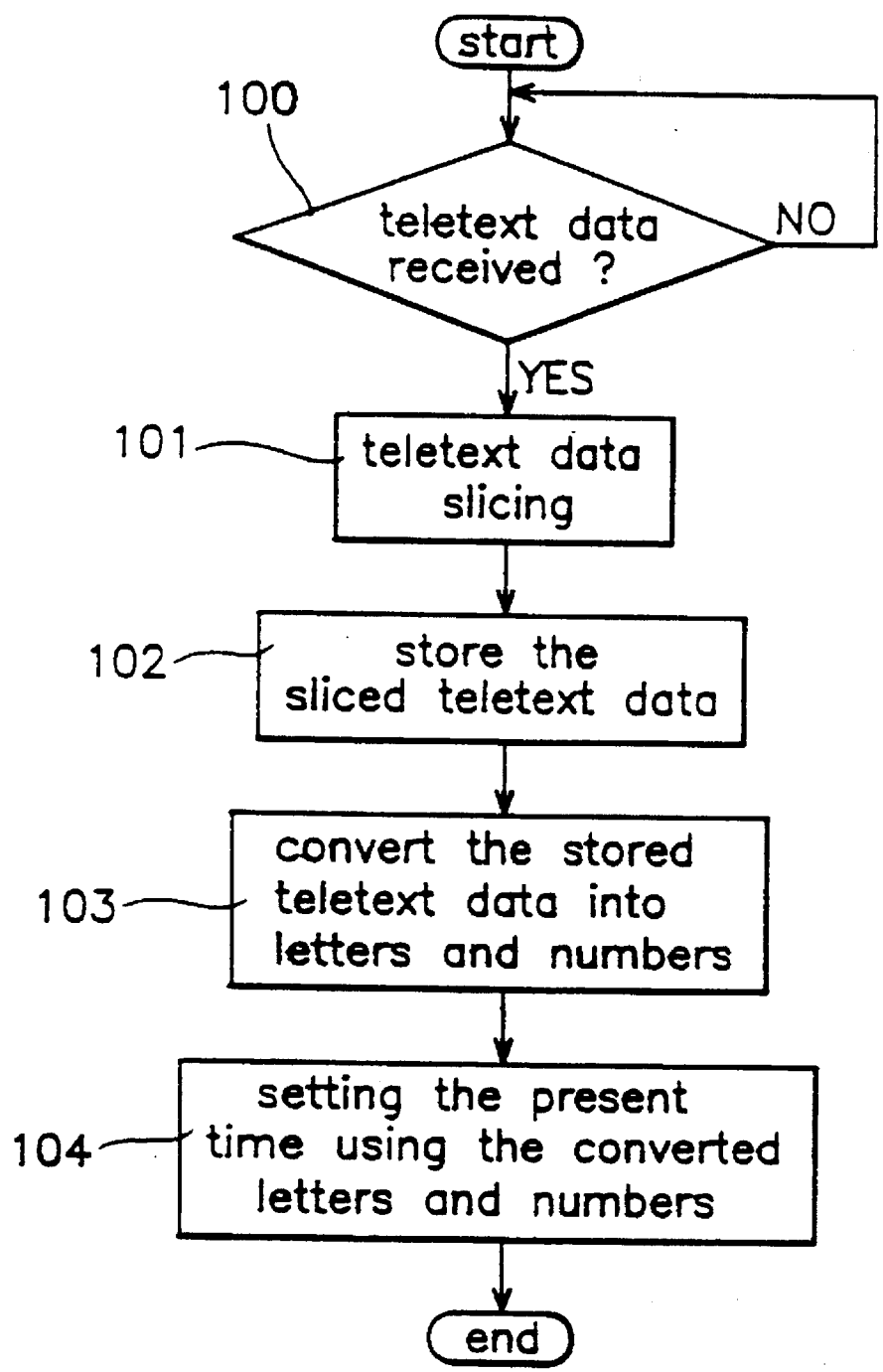

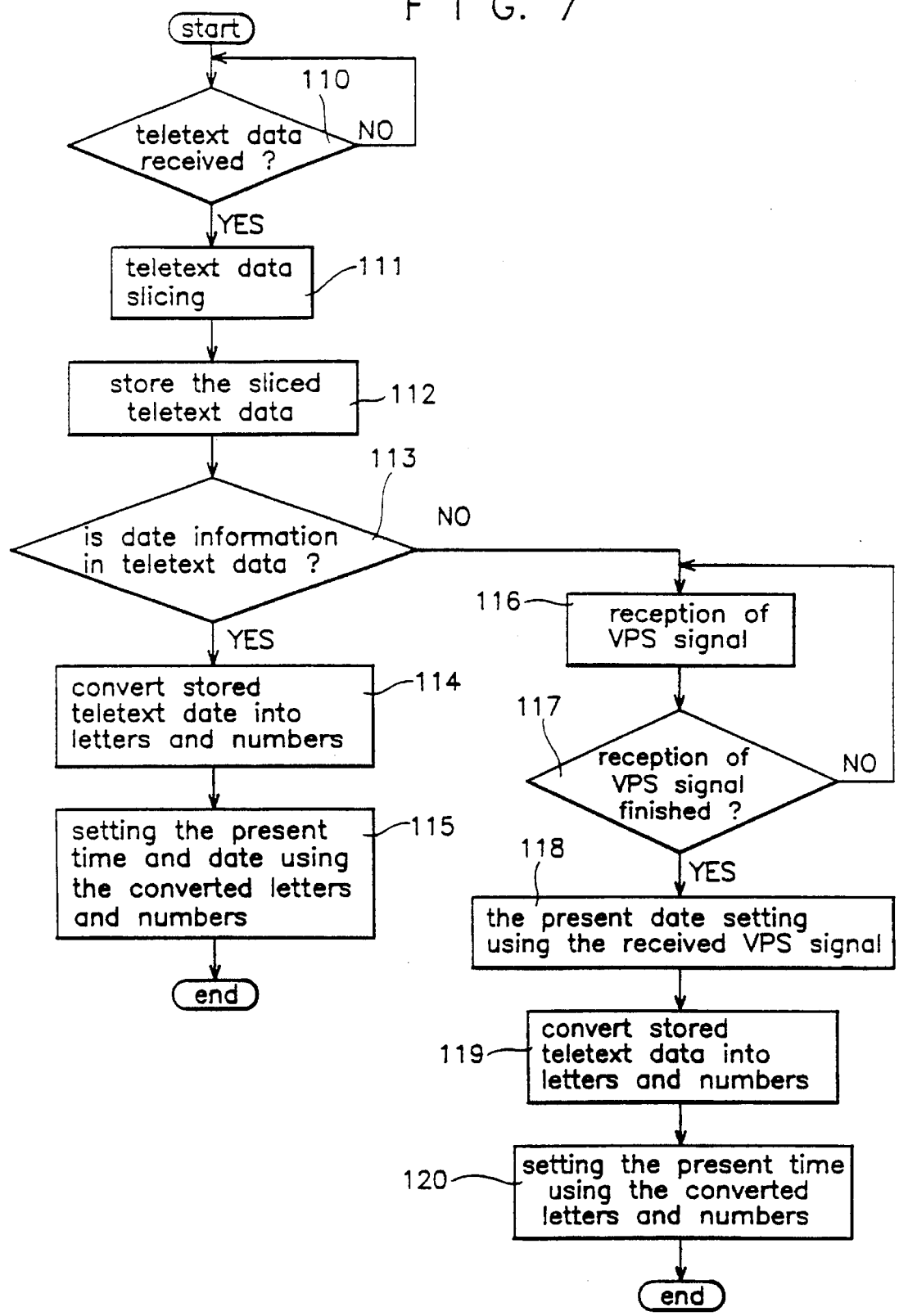

1

METHOD AND APPARATUS FOR USING PROGRAMMING SIGNALS FOR AUTOMATIC TIME SETTINGS

BACKGROUND OF THE INVENTION

1. Field of the Invention

This invention relates generally to a method and apparatus using programming signals for automatic time setting and, more particularly, to a method and apparatus for setting the present time using teletext and video program system programming signals.

2. Description of Related Art

Setting of the present time for a conventional VCR or a TV is carried out manually using an On Screen Display (OSD) or Liquid Crystal Display (LCD) remote controller. FIG. 1 shows an OSD system including a remote controller 1, a remote controller signal reception module 2 for receiving signals from the remote controller 1, a microcomputer 3 for converting the signals received from the remote controller signal reception module 2 into letters and numbers displayable for the OSD, an OSD module 4 for displaying the letters and numbers on a screen under the control of the microcomputer 3, a monitor 6 for displaying the signals received from the OSD 4, and a clock display module 5 for displaying the present set time and date under the control of the microcomputer 3.

Remote controller 1 generates signals in response to pressing of keys on the remote controller 1 and transmits signals to the microcomputer 3 through the remote controller signal reception module 2. Microcomputer 3 converts the signals into characters (letters and numbers) and displays the characters on the monitor 6 through the OSD module 4. The present time and date can also be displayed on the clock display module 5 by setting the present time and date through repeating the foregoing processes and, upon completion of the setting of the present time and date, controlling the clock display module 5 under the control of the microcomputer 3.

FIG. 2 shows an LCD system including an LCD remote controller 7 having a clock display module 7a and a key matrix 7b for displaying the set present time and date, a remote controller signal reception module 8 for receiving remote control signals from the LCD remote controller 7, a microcomputer 9 for receiving signals from the remote control signal reception module 8 to control the present time and date setting, and a clock display module 10 for displaying the set present time and date under the control of the microcomputer 9.

Upon pressing time and date setting key S, the LCD remote controller 7 switches into a time and date setting mode, and upon setting the present time and date with the numeric keys, the set present time and date is displayed on the clock display module 7a. Upon finishing setting of the present time and date, signals for the present time and date are applied to an appliance such as a TV or a VCR desired to be set of time by pressing a transmission key T. The applied signals of the present time and date are transmitted to the microcomputer 9 through the remote control signal reception module 8, and displayed on the clock display module 10 under the control of the microcomputer 9.

With conventional time setting devices, a user is inconvenienced by having to manually correct errors in the time, caused by cumulative clock inaccuracies or seasonal time changes.

SUMMARY OF THE INVENTION

The object of this invention is to solve the foregoing problem by providing a method and a device for automatic time setting using programming signals.

To achieve this and other objects of the invention, an apparatus comprises a clock for keeping the current time; a receiver for receiving a signal containing television video data and time data; and means for setting the clock with the time data.

According to another aspect of the present invention, an apparatus comprises a clock for keeping the current time; a receiver for receiving a signal which television video data is present at certain times and time data is present at other times; and means for setting the clock with the time data.

According to yet another aspect of the present invention, a method comprises the steps of receiving a signal containing video data and non-video data; extracting packages from the non-video; storing the packages; and setting a clock using a stored package.

BRIEF DESCRIPTION OF THE DRAWINGS

FIG. 6 is a flow diagram of an automatic time setting method in accordance with this invention.

FIG. 7 is a detailed flow diagram of an automatic time setting method in accordance with this invention.

DETAILED DESCRIPTION OF THE PREFERRED EMBODIMENTS OF THE INVENTION

Figure 1:
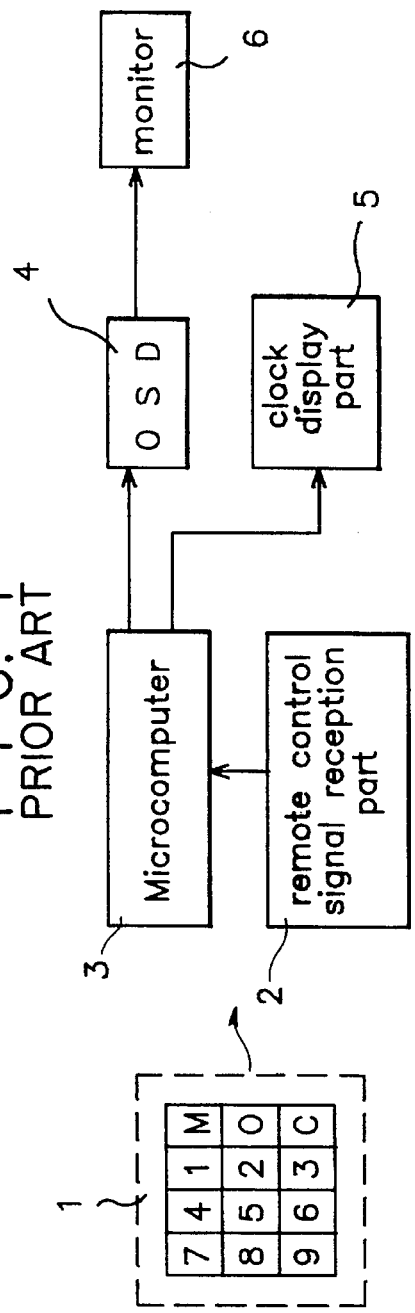
FIG. 1 is a diagram of conventional time setting device.
Figure 2:
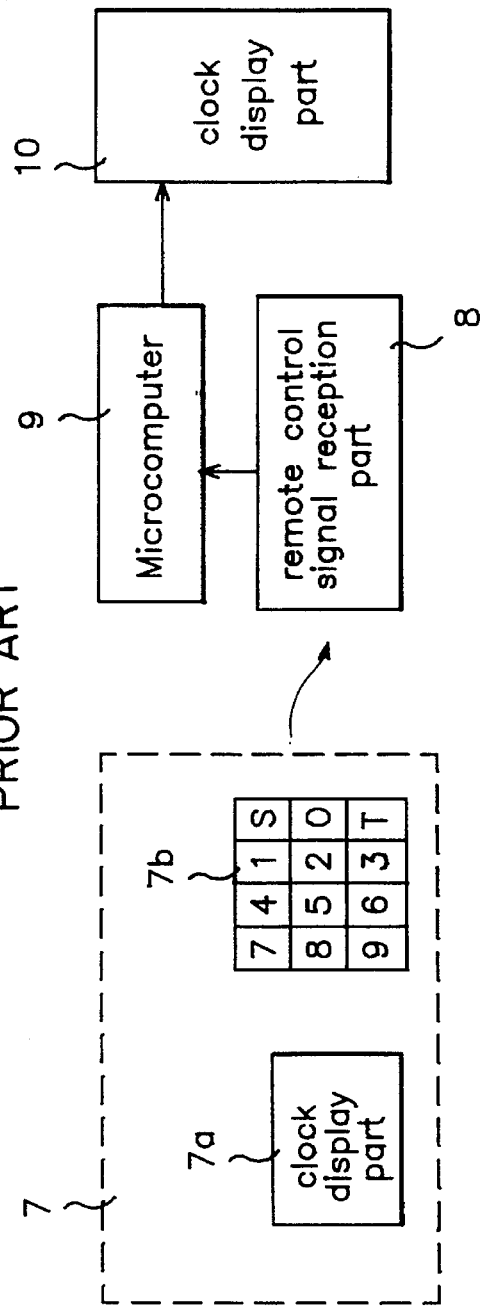
FIG. 2 is a diagram of another conventional time setting device.
Figure 3:
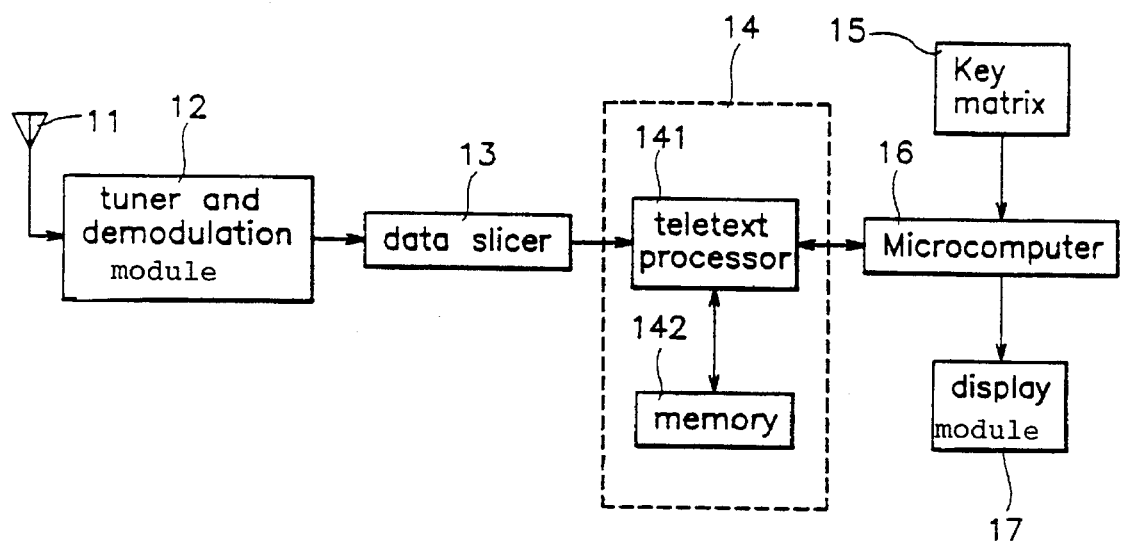
FIG. 3 is a diagram of an automatic time setting device in accordance with one embodiment of this invention.

FIG. 3 shows a first preferred automatic time setting device, including an antenna 11, a tuner and a demodulation module 12, a data slicer 13, a teletext processing module 14, a microcomputer 16, a key matrix module 15, and a display module 17.

The antenna 11 receives broadcasting signals, the tuner and demodulation module 12 synchronizes and receives the broadcasting signals and demodulates the broadcasting signals into composite video signals, and the data slicer 13 detects the teletext data from the signals received from the tuner and demodulation module 12 and slices the detected teletext data into package units.

The teletext processing module 14 includes a teletext processor 141 for converting the teletext data received from the data slicer 13 into character (literal and numeric) data under the control of the microcomputer 16 and a memory 142 for storing the teletext data in package units under the control of the teletext processor 141. The teletext processing module 14 thus converts the teletext data received from the data slicer 13 into data and transmits the character data to the microcomputer 16.

The microcomputer 16 controls the teletext processing module 14 and sets the present time based on the character data received from the teletext processing module 14, and the display module 17 displays the present time set under the control of the microcomputer 19.

The key matrix module 15, connected to the microcomputer 16, is used for manual setting of the present time and for ordering setting of the present time as a user needs.

Operation of the foregoing automatic time setting device in accordance with one embodiment of this invention is explained hereinafter.

Broadcasting signals, received by the antenna 11 and converted into composite video signals at the tuner and demodulation module 12, are transmitted to the data slicer 13 to detect teletext data only and slice the detected teletext data in package units.

In general, the teletext data is transmitted by a broadcasting station in package units, each having 40 bytes, includes 32 packages in total, that is, 30 packages from a first package (package 0) to 29th package (package 29) and 2 additional packages, an 8/30 package and an 8/31 package. The first package (package 0), representing a headline, for example, carries information on time and the 8/30 package carries information on date. The information on date may not be carried in the 8/30 package depending on broadcasting stations. For example, German broadcasting stations typically do not load date information on package 8/30.

When a user orders a setting of the present time through the key matrix module 15, the microcomputer 16 controls the teletext processor 141 to store the teletext data with an assignment of address. Accordingly, the received teletext data sliced in package units is stored into the memory 142 under the control of the teletext processor 141. When the microcomputer 16 generates the addresses corresponding to teletext data of the first package (package 0) and package 8/30, carrying information on time and date of the stored teletext data, and applies the addresses to the teletext processor 141, the teletext processor 141, under the control of the microprocessor 16, reads in the data corresponding to the addresses from the memory 142 and converts the data into character data. The converted character data, applied to the microcomputer 16, is displayed on the display module 17.

When the present time setting signal is generated at the key matrix module 15 in order to control setting of the present time, the microcomputer 16 controls the teletext processing module 14 to transmit character data to the microcomputer 16, and sets the present time based on the character data. Further, the microcomputer 16 can remove errors in time and date by controlling the teletext processing module 14 to transmit character data to the microcomputer 16 and setting the present time and date based on the character data, periodically.

Figure 4:
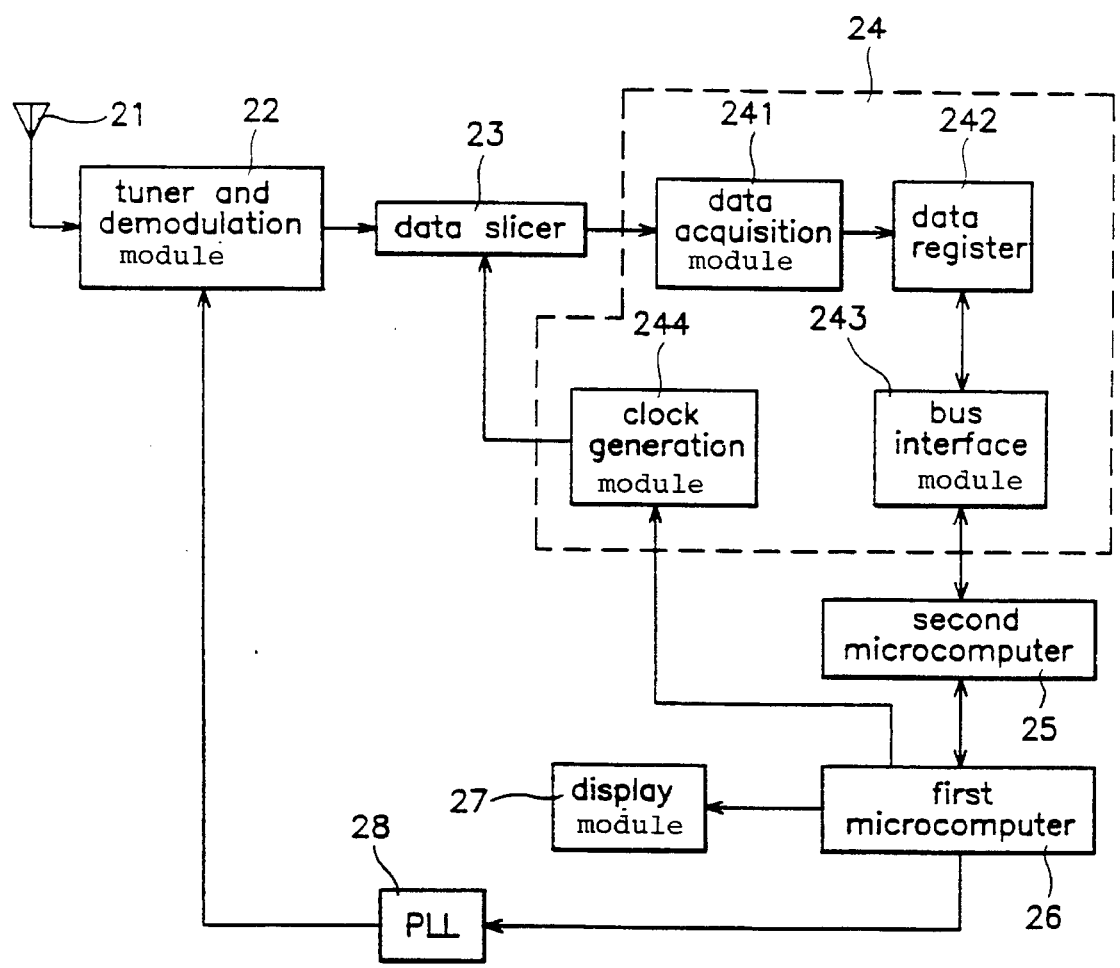
FIG. 4 is a diagram of an automatic time setting device in accordance with another embodiment of this invention.

An automatic time setting device in accordance with a second embodiment of this invention is shown in FIG. 4. The device comprises an antenna 21, a tuner and demodulation module 22, a data slicer 23, a teletext processing module 24, a first microcomputer 26, a second microcomputer 25, a display module 27, and a Phase Locked Loop (PLL) 28.

The antenna 21 receives broadcasting signals transmitted, the tuner and demodulation module 22 receives the broadcasting signals synchronized to the broadcasting signals according to the PLL 28 and demodulates the broadcasting signals into composite video signals, the data slicer 23 detects the teletext data of the first package carrying information on time of the signals received from the tuner and demodulation module 22, and slices the data according to the clock signal received from a clock generation module 244 of the teletext processing module 24.

The teletext processing module 24 includes the clock generation module 244 for generating a clock signal and applying the clock signal to the data slicer 23 under the control of the first microcomputer 26, making the slicer 23 slice only the teletext data of the first package and package 8/30 containing data on time and date. A data acquisition module 241 is included for converting the teletext data received from the data slicer 23 into character data, as is a data register 242 for storing the character data received from the data acquisition module 241 and transmitting the stored data under the control of the first microcomputer 26. Finally, a bus interface module 243 is included in the module 24 for carrying out the interface functions of the data and control signals between the first microcomputer 26 and the data register 242. The teletext processing module 24 thereby converts the teletext data received from the data slicer 23 into character data and applies the character data to the first microcomputer 26 under the control of the first microcomputer 26.

The first microcomputer 26 controls the teletext processing module 24, sets the present time and date based on the character data received from the teletext processing module 24, and controls the PLL 28 under the control of the second microcomputer 25.

The display module 27 displays the set present time under the control of the first microcomputer 26.

The second microcomputer 25 searches the data received from the bus interface module 243 for any errors, so that, if no errors are found, the data received from the bus interface module 243 is applied to the first microcomputer 26 as it is, while if errors are found, the first microcomputer 26 is informed of the development of such errors.

If signals informing the development of errors are applied from the second microcomputer 25 to the first microcomputer 26, the PLL 28 controls the tuner and demodulation module 22 to change synchronization frequency under the control of the first microcomputer 26.

Operation of the foregoing automatic time setting device in accordance with the second embodiment of this invention is explained hereinafter.

First, for setting the present time, the first microcomputer 26 controls the clock generation module 244 to generate a clock signal to enable reception of the teletext data of the first package and of the package 8/30.

Of the composite video signals produced through the antenna 21 and the tuner and demodulation module 22, only the teletext data of the first package carrying information on time is detected and sliced at the data slicer 23 according to the clock signal received from the clock generation module 244.

The sliced teletext data of the first package is converted into character data at the data acquisition module 241, and stored in the data register 242 temporarily. The character data stored in the data register 242 is applied to the second microcomputer 25 through the bus interface module 243 under the control of the first microcomputer 26.

The character data transmitted through the bus interface module 243 to the second microcomputer 25 is searched for any errors therein. That is, the result of a search of whether the data transmitted to the second microcomputer 25 through the data register 242 and the bus interface module 243, is actually character data representing a time or not, is transmitted to the first microcomputer 26.

As a result of the search by the second microcomputer 25, if no errors are found in the character data received from the bus interface module 243, the character data received from the bus interface module 243 is applied to the first microcomputer 26, used to set the present time and date therein, and displayed on the display module 27.

And as a result of the search of the second microcomputer 25, if errors are found in the character data received from the bus interface module 243, the character data received from the bus interface module 243 is not applied to the first microcomputer 26, but an error development signal, representing development of errors, is generated in the second microcomputer 25 and applied to the first microcomputer 26. According to the applied error development signal, the first microcomputer 26 controls the PLL 28 to generate a control signal for changing the synchronization frequency, which, in turn, changes the frequency synchronization signal of the tuner and demodulation module 22, operating to change the reception frequency of the broadcasting signals.

The process for setting the present time and date can be carried out continuously by producing composite video signals at the tuner and demodulation module 22, with the broadcasting signals received based on the changed synchronization frequency, and the teletext data of the first package and the package 8/30 being processed as described above.

The first microcomputer 26 controls the teletext processing module 24 periodically, such that errors in the present time and date can be removed by setting the present time and date based on the character data received from the teletext processing module 24. Also, by connecting the key matrix module to the first microcomputer 26, it is possible to set the present time and date as wanted by a user.

Figure 5:
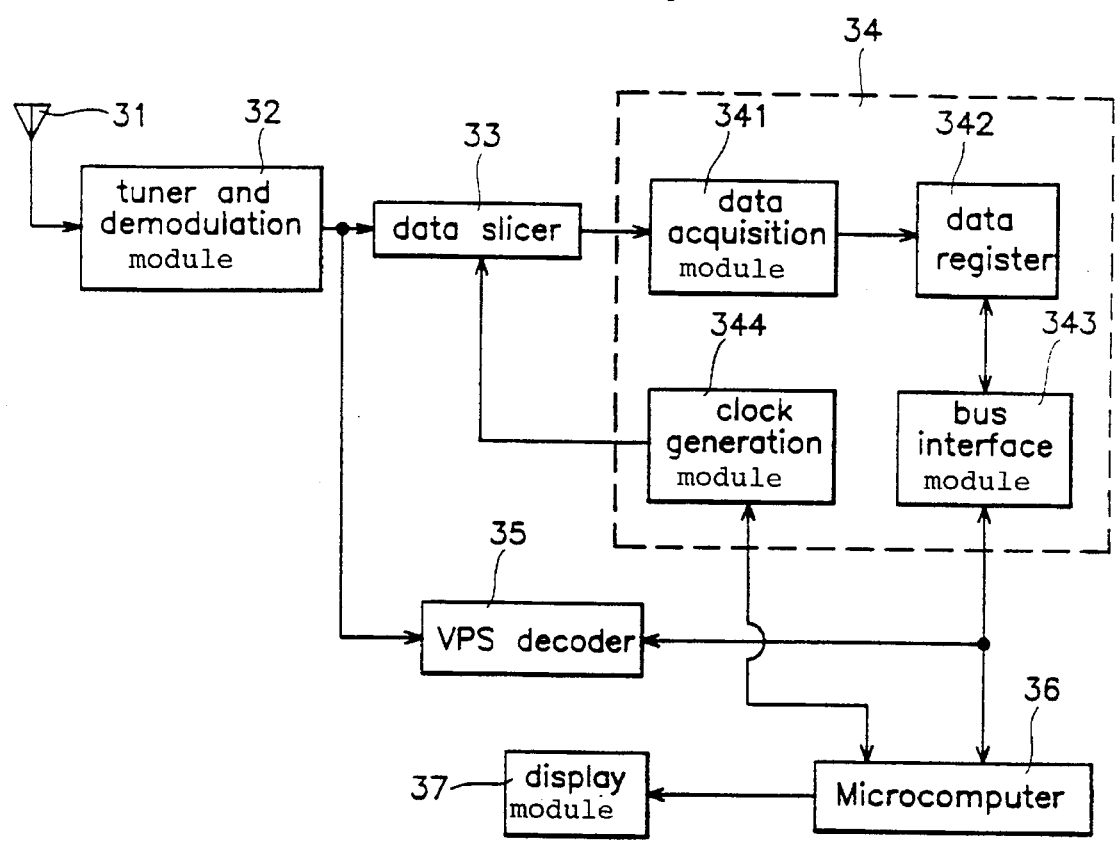
FIG. 5 is a diagram of an automatic time setting device in accordance with still another embodiment of this invention.

An automatic time setting device in accordance with a third embodiment of this invention includes, as shown on FIG. 5, an antenna 31, a tuner and demodulation module 32, a data slicer 33, a teletext processing module 34, a microcomputer 36, a VPS decoder 35 and a display module 37. The third embodiment sets the present time and date by using the Video Program Signal (VPS) to set the present date when there is no transmission of information on the date in the package 8/30 of the teletext data.

The antenna 31 receives broadcasting signals transmitted, the tuner and demodulation module 32 synchronizes and receives the broadcasting signals and demodulates the broadcasting signals into composite video signals. The data slicer 33 detects the teletext data of the first package, carrying information on time of the signals received from the tuner and demodulation module 32, and slices the data according to the clock signal received from the clock generation module 344 of the teletext processing module 34.

The teletext processing module 34 includes the clock generation module 344 for generating a clock signal and applying the clock signal to the data slicer 33 under the control of the microcomputer 36, making the slicer 33 slice only the teletext data of the first package, containing data on time. A data acquisition module 341 converts the teletext data received from the data slicer 33 into character data and data register 342 stores the character data received from the data acquisition module 341 and transmits the stored data under the control of the microcomputer 36. A bus interface module 343 carries out an interface function of the data and control signals between the microcomputer 36 and the data register 342. The teletext processing module 34 thus converts the teletext data received from the data slicer 33 into character data and applies the character data to the microcomputer 36 under the control of the microcomputer 36.

The VPS (Video Program Signal) decoder 35 carries out decoding of the VPS data of in the data received from the tuner and demodulation module 32, and transmits the data representing the present date to the microcomputer 36 to enable the setting of the present date.

The microcomputer 36 controls both the teletext processing module 34 and the VPS decoder 35, sets the present time and date based on the character data representing the present time and date received from the teletext processing module 34 and the VPS decoder 36, respectively.

The display module 37 displays the set present time and date under the control of the microcomputer 36.

Operation of the foregoing automatic time setting device in accordance with the third embodiment of this invention is explained hereinafter.

First, for setting the present time, the microcomputer 36 controls the clock generation module 344 to generate a clock signal to enable reception of the teletext data of the first package and of the package 8/30.

Of the composite video signals produced through the antenna 31 and the tuner and demodulation module 32, only the teletext data of the first package, carrying information on time, is detected and sliced at the data slicer 33 according to the clock signal received from the clock generation module 344.

In this instance, if it is not certain that the package 8/30 is carrying information representing the date, it is possible to so determine by detecting and slicing all of the data of the first package and of the package 8/30 and searching the package 8/30 for the information on date, and carrying out the required process based on the result of the search. That is, if it is found that there is information on date carried by the package 8/30, the VPS decoder 35 is not used. If it is found that there is no information on date carried by the package 8/30, the VPS decoder 35 is used.

The sliced teletext data of the first package is converted into character data at the data acquisition module 341, and stored in the data register 343 temporarily. The character data stored in the register 343 is applied to the microcomputer 36 through the bus interface module 343, under the control of the microcomputer 36 through the bus interface module 343. The character data received from the bus interface module 343 is applied to the microcomputer 36, used to set the present time and date therein, and displayed on the display module 37.

Composite video signals received from the tuner and demodulation module 32 are converted into data representing the present date by detected and decoded VPS data at the VPS decoder 35. Data representing the present date is applied to the microcomputer 36, together with the character data representing the present time received from the bus interface module 343, on the basis of which data, the present time and date is set in the microcomputer 36 and displayed on the display module 37.

Operational processes of an automatic time setting method in accordance with the preferred embodiments of the present invention are explained hereinafter with reference to FIG. 6.

First, teletext data carried by broadcasting signals is received, and upon reception of the teletext data, a teletext data processing step for slicing the teletext data in package units is carried out (100 and 101). After carrying out the teletext data processing step, a teletext data storing step (102) for storing the sliced teletext data in package units is carried out. After carrying out the teletext data storing step, a present time setting step (103 and 104) is carried out for setting the present time using the stored teletext data. That is, the stored data is converted into character data, and using the converted character data, the present time is set.

Operational processes of an automatic time setting method in accordance with the third embodiment of the invention are explained hereinafter in detail with reference to FIG. 7.

First, the teletext data carried by broadcasting signals is received, and upon reception of the teletext data, a teletext data processing step for slicing the teletext data into package units is carried out (110 and 111) and, after carrying out the teletext data processing step, a teletext data storing step (112) is carried out to store the sliced teletext data in package units. The same steps apply with the teletext data processing step (100 and 101) and the teletext data storing step (102) of FIG. 6.

The present time setting step (103 and 104), after the foregoing steps, includes a teletext data searching step (113) for searching the teletext data for date information, a time and date setting step using teletext data (114 and 115) for setting the present time and date, using the stored teletext data in case the teletext data contains date information as a result of carrying out the teletext data searching step, and a time and date setting step using teletext data and VPS signals (116, 117, 118, 119, and 120) for setting the time using stored teletext data and setting the date by receiving VPS signals in case the teletext data is found to have no date information as a result of carrying out the teletext data searching step (113).

Herein, the teletext data searching step (113) is carried out by searching the data of package 8/30 of the teletext data for information on date, especially, searching the data of format 1 carrying information on date. The reason for carrying out the teletext data searching step (113) is to use VPS signals in case the teletext data is found to not carry information on date. If the teletext data carries information on date, the stored teletext data is converted into character data (114) and the present time and date is set using the character data (115). If the teletext data does not carry information on date, VPS signals (116 and 117) are received and the VPS signals are used to set the present date (118), and the stored teletext data is converted into character data (119) and the present time and date is set (120) using the character data.

Thus, this invention has advantages of eliminating the inconvenience to users at manual setting and correcting clock devices by facilitating automatic setting and correcting of clock devices of VCRs and TVs using time and date information contained in teletext data and VPS data carried by any broadcasting signals available.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. An apparatus comprising:

a clock for keeping the current time;

a receiver for receiving a signal containing television video data and time data;

means for setting the clock with the time data;

a phase locked loop for applying a synchronization signal to the receiver; and means for changing a frequency of the synchronization signal in response to an error detection in the time data.

2. The apparatus of claim 1, further including a key pad for setting the clock manually.

3. The apparatus of claim 1, further including a key, wherein the means for setting sets the clock with the time data, in response to a signal from the key.

4. The apparatus of claim 1, further including a memory for storing the time data.

5. The apparatus of claim 1, wherein the setting means includes means for setting the clock periodically.

6. The apparatus claimed in claim 1, further including means for converting the time data into characters.

7. The apparatus of claim 1, further including a decoder, coupled to the receiver, for decoding a date signal to generate date data, wherein the setting means sets the clock with the date data.

8. The apparatus of claim 1, wherein the receiver includes means for processing the time data as teletext format data.

9. The apparatus of claim 1, further including a video recorder for recording the television video data.

10. The apparatus of claim 1, further including a television display for displaying the television video data.

11. An apparatus comprising:

a clock for keeping the current time;

a receiver for receiving a signal in which television video data is present at certain times and time data is present at other times;

means for setting the clock with the time data;

a phase locked loop for applying a synchronization signal to the receiver; and means for changing a frequency of the synchronization signal in response to an error detection in the time data.

12. The apparatus of claim 11, further including a video recorder for recording the television video data.

13. The apparatus of claim 11, further including a television display for displaying the television video data.

14. A method of setting a clock comprising the steps of:

receiving, at a receiver, a signal containing video data, non-video data, time data;

extracting packages from the non-video data;

storing the extracted packages;

searching the stored packages for date information;

converting the stored packages into character data;

setting the clock using the character data;

applying a synchronization signal to the receiver; and changing a frequency of the synchronization signal in response to an error detection in the time data.

15. The method of claim 14, wherein the searching step searches the package 8/30 for information on date.

\* \* \* \* \*